United States Patent [19]

Cornell et al.

[11] Patent Number: 4,988,843

[45] Date of Patent: Jan. 29, 1991

[54] ELECTRICAL FLASH BUTT WELDING APPARATUS

[75] Inventors: William D. Cornell, Finksburg; Donald E. Rexrode, Baltimore; Delmer B. Wolfe, Abingdon, all of Md.; Nicholas D. Remy, Allentown, Pa.

[73] Assignee: Bethleham Steel Corporation, Bethlehem, Pa.

[21] Appl. No.: 461,151

[22] Filed: Jan. 4, 1990

[51] Int. Cl.5 .............................................. B23K 11/04
[52] U.S. Cl. ...................................... 219/100; 219/97
[58] Field of Search .......................... 219/97, 100, 101; 15/77

[56] References Cited

U.S. PATENT DOCUMENTS

| | | | |
|---|---|---|---|
| 580,312 | 4/1897 | Harris | 15/77 |
| 688,450 | 12/1901 | Wagner | 29/81 H |
| 772,822 | 10/1904 | Peterson | 15/77 |
| 1,191,925 | 7/1916 | Butterworth et al. | 15/77 |
| 1,582,549 | 4/1926 | Sessions | 219/78.14 |
| 2,432,750 | 12/1947 | Goldsworthy | 219/78.14 |
| 2,466,644 | 4/1949 | McBride | 29/81 H |
| 3,015,713 | 6/1962 | Eckler et al. | 219/78.14 |
| 3,484,579 | 12/1969 | Seeloff | 219/97 |
| 4,096,375 | 6/1978 | Fujino et al. | 219/97 |

Primary Examiner—Clifford C. Shaw
Attorney, Agent, or Firm—John I. Iverson

[57] ABSTRACT

Apparatus for electrical flash butt welding the ends of metal sheet or strip including a pair of flat faced parallel welding electrodes extending across the full width of the metal sheet or strip, one on each side thereof, and an electrode cleaning device comprising a support assembly having mounted thereon an extendable electrode cleaning means including a cleaning head having a plurality of upward extending cleaning members and a plurality of downwardly extending cleaning members the cleaning head adapted to simultaneously remove dirt and contaminants from the contact surfaces of opposed welding electrodes.

2 Claims, 2 Drawing Sheets

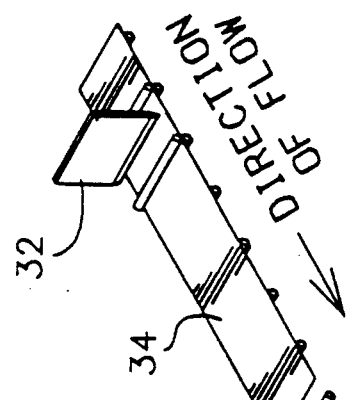
Fig. 5
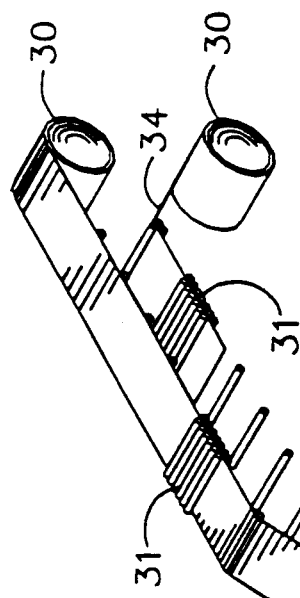
Fig. 4
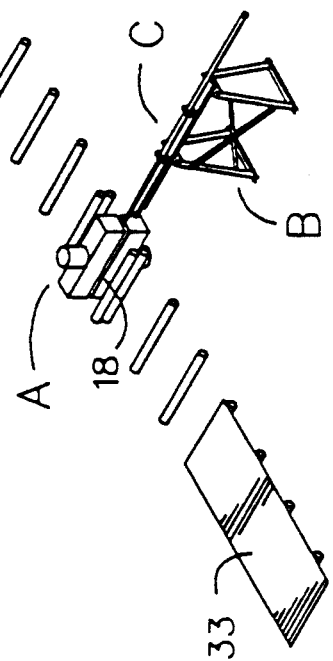

4,988,843

ELECTRICAL FLASH BUTT WELDING APPARATUS

BACKGROUND OF THE INVENTION

In resistance or flash welding of sheet or strip, electrical current is caused to flow through the strip by means of two opposed electrodes. Contaminants, found on the surface of the strip, can become trapped between the strip and the electrodes during the welding cycle and adhere to the electrode face creating hot spots which cause localized melting of the electrodes. When this happens, molten copper from the electrodes is deposited upon the surface of the strip and these contaminated areas become very hard or brittle causing cracks and/or holes during the cold reduction of the ferrous strip. Occasionally tears initiate from these defects and propagate through the sheet or strip.

Pits, formed in the electrode's face where copper has been melted away, can continue to form hot spots and are enlarged with subsequent welding cycles. This repeated localized melting of the electrodes causes reduced electrode service life and premature mill shutdown for electrode reconditioning.

Flash welders installed along continuous pickling lines are subjected to an extraordinary amount of dirt and contaminants. Mill scale, oils and water are dragged onto the electrode faces by the strip. In addition, grit created from the molten metal expelled during the welding cycle falls onto the electrode faces in the form of contaminants. The wear on welding electrodes in such an environment is extreme due to hot spots caused by the contaminating materials and the short electrode service life causes frequent mill shutdowns.

SUMMARY OF THE INVENTION

It is therefore an object of this invention to provide an apparatus for electrical flash butt welding the ends of metal strip having means for removing contaminants from the surface of electrodes.

It is a further object of this invention to extend electrode life by eliminating hot spots caused by contaminants on the electrode surfaces.

It is a further object of this invention to provide mechanical means for removing contaminants from welding electrode surfaces.

It is a further object of this invention to provide mechanical means capable of removing contaminants from welding electrodes between successive welding cycles.

I have discovered that the foregoing objects can be attained by providing an electrical flash butt welding apparatus including an electrode cleaning device comprising a support assembly located adjacent the welding electrodes of the resistance or flash butt welding apparatus the support assembly having mounted thereon an extendable electrode cleaning means including a cleaning head having a plurality of upward extending cleaning members and a plurality of downwardly extending cleaning members the cleaning head adapted to simultaneously remove debris from the contact surfaces of opposed welding electrodes while they are in the spaced open inactive position.

BRIEF DESCRIPTION OF THE DRAWINGS

FIG. 4 is a schematic isometric view of a continuous strip line showing the welding apparatus of the present invention.

FIG. 5 is an enlarged portion of the continuous strip line of FIG. 4.

DETAILED DESCRIPTION OF THE PREFERRED EMBODIMENT

Figure 1:
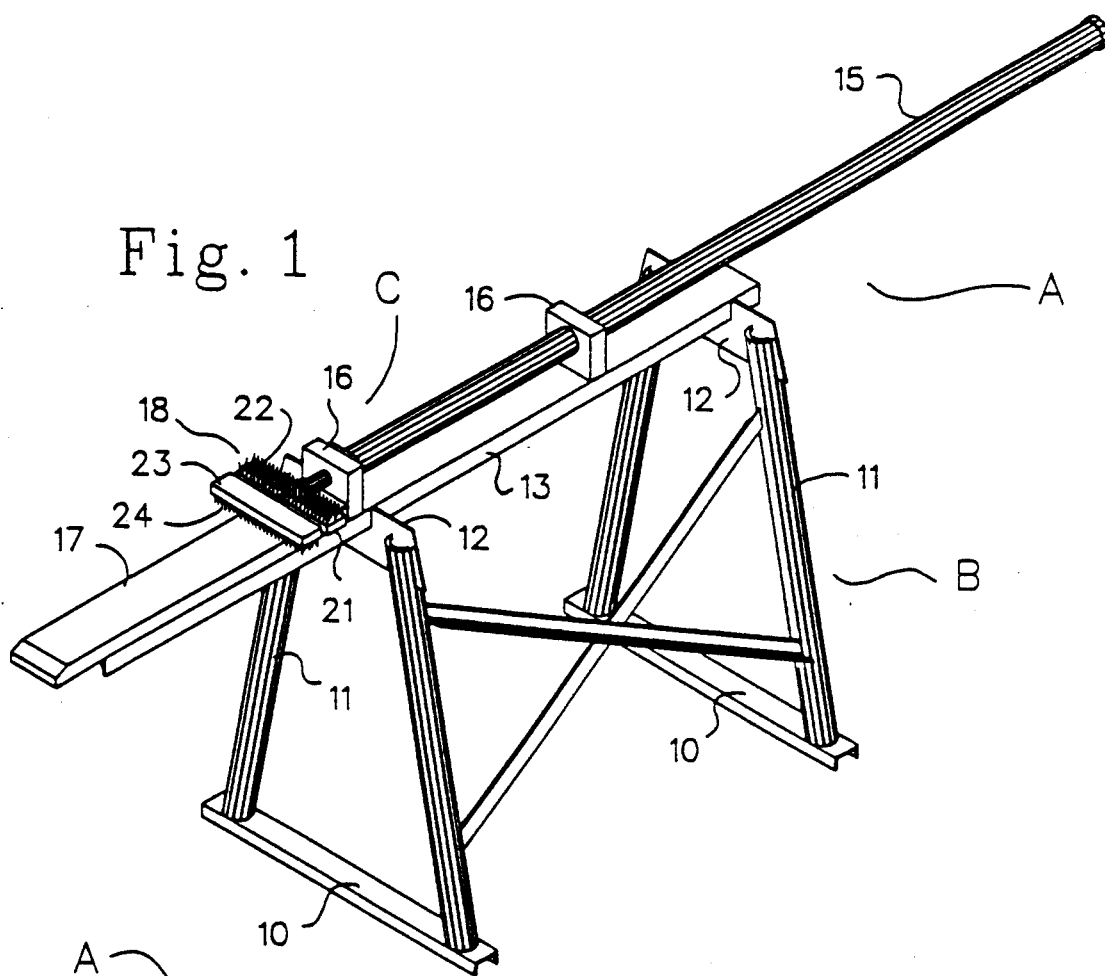
FIG. 1 is an isometric view of the electrode cleaning device of the flash butt welding apparatus of the present invention.

Referring to FIG. 1 of the drawings, the electrode cleaning portion of the resistance or flash welding apparatus "A" is shown to comprise a support assembly "B" and an electrode cleaning assembly "C". The support assembly "B" is a weldment of various members including base members 10, for attaching support assembly "B" to the floor or other ridged structure of the mill, support legs 11, attached to the base members 10 and attached to gusset plates 12, and a cantilevered support member 13, attached to the gusset plates 12 having one end thereof adjacent the welding electrodes 14 of the resistance welding apparatus "A". The electrode cleaning assembly "C" includes a fluid operated cylinder 15, cylinder support blocks 16, attached to the cantilevered support member 13 of support assembly "B", a cleaning head guide means 17 and an extendable cleaning head 18, attached to the piston rod or extendable arm 19 of cylinder 15.

Extendable cleaning head 18 of the electrode cleaning assembly "C" includes a first plate 21 having a plurality of upwardly extending cleaning members 22 and a second plate 23 having a plurality of downwardly extending cleaning members 24. Cleaning head 18 is attached to piston rod extendable arm 19 of cylinder 15 which imparts a back and forth motion to the cleaning head 18 and, when fully extended, arm 19 conveys cleaning head 18 to the far side of the flash welding electrodes 20.

Figure 2:
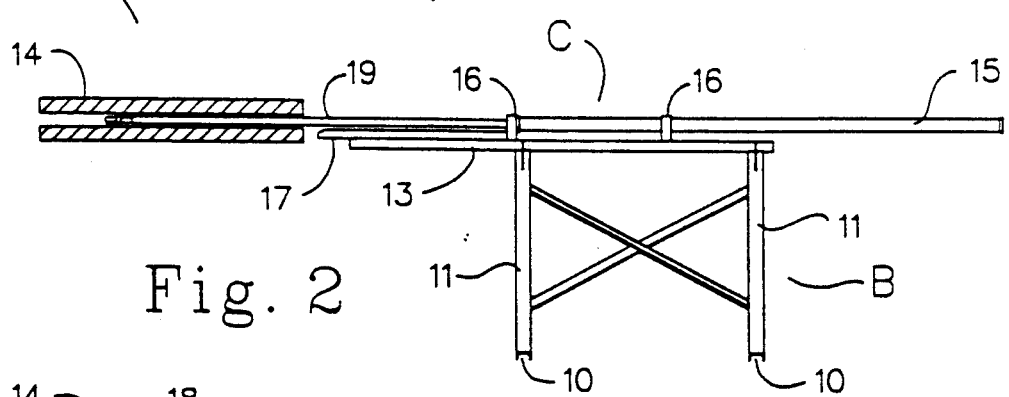
FIG. 2 is an elevational view of the flash butt welding apparatus of the present invention showing the electrode cleaning device in the extended position inserted in between the spaced open inactive electrodes.
Figure 3:
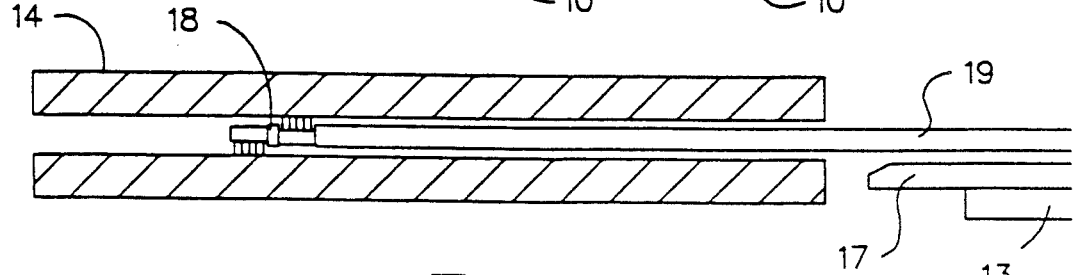
FIG. 3 is an enlarged view of the electrode portion of FIG. 2.

Referring to FIG. 4 of the drawings, strip is fed into the mill from payoff reels 30 at the coil entry end of a continuous pickling line which includes flatteners 31, shears 32, and the flash butt welding apparatus "A" of the present invention. The equipment located along the coil entry end of the mill is for handling and charging the coiled strip into the pickling tanks and mill stands which are not shown in the drawings. As the first strip 33 is used up from one payoff reel a second payoff reel begins to feed a second strip 34 into the mill. The trailing end and leading end of the first and second strips are sheared at stand 32 to provide squared ends for flash butt welding and, as shown in FIG. 5, the trailing end of the first strip 33 is passed to a location upline from the flash butt welding apparatus "A" providing an unrestricted open area between electrodes 20 as shown in FIGS. 2, 3 and 5. Cylinder 15 of the electrode cleaning assembly "C" is activated causing arm 19 and the extendable cleaning head 18 to be cycled from a retracted, stored position, to a fully extended position at the far side of and in between the opposed horizontal flat contact surfaces of the welding electrodes 20, and back to a retracted, stored position. As cleaning head 18 is extended and retracted between electrodes 20 the back and forth motion causes the upwardly extending cleaning members 22 and downwardly extending cleaning members 24 to simultaneously scrape and push debris from the welding electrodes 20 thereby providing cleaned electrode contact surfaces for the flash butt of the first and second strips. With the extendable cleaning head 18 in its stored position the trailing end and leading end of the first and second strips are inserted between electrodes 20 and butted together. Means (not shown) for moving electrodes 20 from an open inactive position to a closed welding position in contact with the top and bottom surfaces of the first and second strips is activated and the flash butt weld is made. The means for moving the welding electrodes 20 is again activated opening the electrodes to their inactive position and the continuous mill operation is restarted.

I claim:

1. A method for flash butt welding the ends of metal strip on a continuous strip mill the steps, comprising:
    (a) shearing the trailing end of the first strip,
    (b) shearing the leading end of the second strip,
    (c) removing said first strip from between the spaced open opposed electrodes of a flash butt welding apparatus,
    (d) reciprocally conveying between the horizontal flat parallel contact surfaces of said spaced open opposed electrodes a cleaning means capable of simultaneously engaging and cleaning debris from the horizontal flat parallel contact surfaces of both electrodes the cleaning means comprising an upper cleaning means said upper cleaning means including a plate having a width substantially equal to the horizontal contact surface width of the upper electrode and including a plurality of upward extending cleaning members for engaging and cleaning debris from the horizontal flat contact surface of said upper electrode, and, a lower cleaning means said lower cleaning means including a plate having a width substantially equal to the horizontal contact surface width of the lower electrode and including a plurality of downward extending cleaning members for engaging and cleaning debris from the horizontal flat contact surface of said lower electrode,
    (e) removing said cleaning means from between the horizontal flat parallel contact surfaces of said spaced open opposed electrodes, and
    (f) inserting between said spaced open opposed electrodes the trailing end and the leading end of said first strip and second strip, butting together the trailing end and the leading end of said first and second strip, and, activating said means for moving said electrodes from a spaced open inactive position to a closed welding position in contact with the top and bottom surfaces of said first and second metal strip.

2. In an electrical strip welder having electrodes provided with horizontal opposed flat parallel contact surfaces extending across the full width of the metal strip to be welded, an electrode cleaning apparatus, comprising:
    (a) a cleaning assembly attached to and supported by a support assembly said support assembly located adjacent one side of the welding electrodes,
    (b) an extendable arm capable of being extended parallel to and across substantially the full width of the spaced open horizontal opposed contact surfaces of said welding electrodes, and
    (c) a cleaning means attached to one end of said extendable arm said cleaning means comprising an upper cleaning means and a lower cleaning means capable of simultaneously engaging and cleaning debris from the horizontal opposed flat parallel contact surfaces of both electrodes as said cleaning means is reciprocally conveyed between the spaced open electrodes said upper cleaning means includes a plate having a width substantially equal to the horizontal contact surface width of the upper electrode said plate including a plurality of upward extending cleaning members for engaging and cleaning debris from the horizontal flat contact surface of said upper electrode, and, said lower cleaning means includes a plate having a width substantially equal to the horizontal contact surface width of the lower electrode said plate including a plurality of downward extending cleaning members for engaging and cleaning debris from the horizontal flat contact surface of said lower electrode.

* * * * *